US008853311B2

(12) United States Patent
Millward et al.

(10) Patent No.: US 8,853,311 B2
(45) Date of Patent: Oct. 7, 2014

(54) **BLOCK COPOLYMER-COMPRISING COMPOSITIONS AND METHODS OF PURIFYING PS-*B*-PXVP**

(75) Inventors: Dan Millward, Boise, ID (US); Scott Sills, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 45 days.

(21) Appl. No.: 13/609,909

(22) Filed: Sep. 11, 2012

(65) Prior Publication Data

US 2013/0005903 A1 Jan. 3, 2013

Related U.S. Application Data

(62) Division of application No. 12/326,770, filed on Dec. 2, 2008, now Pat. No. 8,314,206.

(51) Int. Cl.
*C08F 226/06* (2006.01)
*C08F 8/00* (2006.01)
*C08L 53/00* (2006.01)

(52) U.S. Cl.
CPC ..................................... *C08L 53/00* (2013.01)
USPC .............. 524/401; 524/850; 525/89; 525/280

(58) Field of Classification Search
USPC .............. 524/850, 401, 438, 849; 525/88, 89, 525/242, 280
See application file for complete search history.

(56) References Cited

U.S. PATENT DOCUMENTS

| 3,915,797 A | 10/1975 | Ishimatsu et al. | |
| 5,550,194 A | 8/1996 | Hoxmeier et al. | |
| 5,571,864 A | 11/1996 | Bates et al. | |
| 6,969,491 B1 * | 11/2005 | Marx et al. | 422/129 |
| 7,329,354 B2 | 2/2008 | Mullee | |
| 2003/0035746 A1 | 2/2003 | Kim | |

FOREIGN PATENT DOCUMENTS

WO  WO2007/102980   9/2007

OTHER PUBLICATIONS

Braun, D. et al. Polymer Synthesis: Theory and Practice:Fundamentals, Methods, Experiments (4th Edition) Springer (2005) pp. 197-200 and 254-256.*
Svarovsky, L. Solid-Liquid Separation Elsevier Butterworth-Heinemann (2001) pp. 335-348.*
Wheeler, I. Metallic Pigments in Polymers Smithers Rapra Technology (1999) pp. 7-10.*
Eastman, C.E. et al Macromolecules vol. 27 (1994) pp. 5591-5598.*
Armarego, W. et al. Purification of Laboratory Chemicals 5th Edition Elsevier Science (2003) pp. 6-9.
Huang, C. et al "Structural Evolution of Poly(styrene-b-4-vinylpyridine) Diblock Copolymer/Gold nanoparticle Mixtures from Solution to Solid State" Macromolecules vol. 40 (2007) pp. 5067-5074.
Polymersource.com Data Sheet, at least as early as Aug. 22, 2008.
Rydberg, J. et al Solvent Extraction Principles and Practice, Revised and Expanded Marcel Dekker, Inc. (2004) sections to 4.1 to 4.1.3.
Tetrahydrofuran (THF) Storage and Handling published by BASF Corporation, Mount Olive NJ (1998) pp. 1-20.
Gao et al.; Communications to the Editor—Bock Copolymer "Crew-Cut" Micelles in Water; Marcomolecules, vol. 27; 1994; pp. 7923-7927.
Varshney et al.; Anionic Homopolymerization and Block Copolymerization of 4-Vinylpyridine and its Investigation by High-Temperature Size-Exclusion Chromatography in N-Methyl-2-pyrrolidinone; Maromolecules, vol. 26; 1993: pp. 701-706.

* cited by examiner

*Primary Examiner* — Irina S Zemel
*Assistant Examiner* — Jeffrey Lenihan
(74) *Attorney, Agent, or Firm* — Wells St. John, P.S.

(57) ABSTRACT

In one embodiment, a block copolymer-containing composition includes PS-b-PXVP and a lithium salt, where "X" is 2 or 4. All lithium salt is present in the composition at no greater than 1 ppm by weight. In one embodiment, a homogenous block copolymer-including comprising has PS-b-PXVP present in the composition at no less than 99.99998% by weight, where "X" is 2 or 4. Methods of forming such compositions are disclosed.

21 Claims, No Drawings

BLOCK COPOLYMER-COMPRISING COMPOSITIONS AND METHODS OF PURIFYING PS-B-PXVP

CROSS-REFERENCE TO RELATED APPLICATIONS

This patent resulted from a divisional application of U.S. patent application Ser. No. 12/326,770, filed Dec. 2, 2008, entitled "Block Copolymer-Comprising Compositions and Methods of Purifying PS-b-PXVP", naming Dan Millward and Scott E. Sills as inventors, the disclosure of which is incorporated herein by reference.

TECHNICAL FIELD

Embodiments disclosed herein pertain to block copolymer-comprising compositions and to methods of purifying PS-b-PXVP from a solid comprising PS-b-PXVP and a lithium salt, and from a solution comprising dissolved PS-b-PXVP and a dissolved lithium salt.

BACKGROUND

Numerous applications exist in which it is desired to form repeating patterns having a small pitch (for example, a pitch of less than about 50 nanometers). For instance, integrated circuitry fabrication may involve formation of repeating patterns of memory storage units (i.e., NAND unit cells, dynamic random access [DRAM] unit cells, cross-point memory unit cells, etc.). Additionally, nanoscale mechanical, chemical, biological and other electrical devices and systems are being fabricated.

Photolithography is a conventional method used for fabrication of nanoscale devices and systems. Photolithography uses incident radiation of a selected wavelength to pattern a photosensitive material. The exposed or un-exposed portions of the photosensitive material are then selectively removed relative to the other. The material which remains is used as a mask in patterning underlying substrate material which is exposed through openings in the mask.

A continuing goal in integrated circuitry fabrication is to increase circuit density, and accordingly to decrease size of individual integrated circuit components. Thus, there is a continuing goal to form patterned masks to have increasing densities of individual features and less space between adjacent features. If photolithography alone is used to pattern integrated circuit components, circuit density is limited by a threshold dictated by the minimal attainable feature size using the particular photolithographic technology. The minimum feature size is dictated by, for example, a wavelength utilized during patterning of the photosensitive material. Conventional photolithographic processing methods are not readily capable of accommodating fabrication of structures and features much below the 100 nanometer level.

Methods have been developed which can be used in combination with photolithography or other processing to push the minimum attainable feature size to smaller dimensions than may be achieved with photolithography alone. One such method is a procedure comprising use of a block copolymer material to form a pattern between a pair of photolithographically-patterned, or other patterned, features. Block copolymer materials spontaneously assemble into periodic structures by microphase separation of the constituent polymer blocks upon annealing at a suitably high temperature. Such form ordered domains at nanometer-scale dimensions between the photolithographically-patterned, or other patterned, features. Following such self-assembly, one block of the copolymer can be selectively removed thereby leaving a mask having nano-sized features and openings through which underlying substrate material can be processed.

Copolymers are polymers derived from two or more monomeric species. Block copolymers contain two or more homopolymer subunits linked by covalent bonds. Two example block copolymer materials are polystyrene-b-poly2-vinylpyridine and polystyrene-b-poly4-vinylpyridine, and which are referred to herein as PS-b-PXVP where "X" is 2 or 4.

Conventional processes by which PS-b-PXVP is manufactured result in impurities being received in the composition. Example impurities include lithium salts, for example lithium chloride. Some commercially available PS-b-PXVP has lithium salt on the order of 400 to 500 parts per million by weight in the composition. Such can result in lithium salt particles on the substrate on which the mask is being formed, and about which block copolymer patterns can form upon anneal as opposed to solely relative to the previously patterned features.

DETAILED DESCRIPTION OF EXAMPLE EMBODIMENTS

The invention in one embodiment comprises a block copolymer-comprising composition which includes PS-b-PXVP and a lithium salt, where "X" is 2 or 4, and wherein all lithium salt present in the composition totals no greater than 1 ppm by weight. In one embodiment, all lithium salt is present in the composition at no greater than 0.1 ppm by weight. One or more lithium salts may be present, with one example being lithium chloride and a lower concentration of which was motivated by the problems identified in the "Background" section above.

Salts other than lithium salt may also be present. If so, in one embodiment, such other salts are individually present in the composition at no greater then 10 ppm by weight. In one embodiment, any salts other than lithium salt are collectively present in the composition at no greater than 25 ppm by weight. The composition may also include material other than salt, for example, nickel, copper, and/or zinc. The composition may or may not be homogenous. In one embodiment, the PS-b-PXVP is present in the composition at no less than 99.99998% by weight. Minimizing lithium salt content to no greater than 1 ppm by weight, and even more ideally to be no greater than 0.1 ppm by weight, may overcome the prior art problems identified above when used in block copolymer self-assembly in forming mask or other patterns on a substrate. Heretofore, lowest known concentration of lithium salt in a composition comprising PS-b-PXVP and a lithium salt is 50 ppm by weight. The composition may comprise one or both of PS-b-P2VP and PS-b-P4VP.

One embodiment of the invention is a homogenous block copolymer-comprising composition having PS-b-PXVP present in the composition at no less than 99.99998% by weight, and independent of any presence of a lithium salt. Such composition may comprise one or both of PS-b-P2VP and PS-b-P4VP. Prior art PS-b-PXVP-comprising compositions have heretofore not included such above example purities, and accordingly methods for producing such have not heretofore been discovered or developed.

Embodiments of the invention also include methods of purifying PS-b-PXVP from a solid comprising PS-b-PXVP and a lithium salt. The solid may comprise one or both of PS-b-P2VP and PS-b-P4VP. In such embodiments, the solid comprising the PS-b-PXVP and lithium salt is dissolved in a carbon-containing liquid solvent, with such solvent itself being soluble in liquid water. Examples include tetrahydrofuran, nitroethane, nitrobenzene, dimethylformamide, acetone, methylethylketone, a pyridine, and a dioxane. Additionally, the carbon-containing liquid solvent might include any combination of two or more of such example liquid solvents. Such act of dissolving can occur by any existing or yet-to-be developed method, and may be conducted at any suitable temperature and pressure, with ambient room temperature and pressure being an example. Further, embodiments of the invention include methods of purifying PS-b-PXVP from a solution comprising dissolved PS-b-PXVP, a dissolved lithium salt, and a carbon-containing liquid solvent that is soluble in liquid water. The dissolved PS-b-PXVP may comprise one or both of PS-b-P2VP and PS-b-P4VP.

The carbon-containing liquid solvent having the dissolved PS-b-PXVP and lithium salt is combined with liquid water. An example ratio range of liquid water to carbon-containing liquid solvent is from 2:1 to 1,000:1 parts by volume, with 10:1 being a specific example. A first precipitate precipitates out of the solution and has a greater concentration PS-b-PXVP and less concentration lithium salt than was in the starting solid. The combining of the carbon-containing liquid solvent having the dissolved solid with liquid water can occur at any suitable temperature and pressure, with ambient room temperature and pressure being an example. However, greater degree of precipitation may result at temperatures below room temperature. In one embodiment, the carbon-containing liquid solvent having the dissolved solid and the liquid water are combined at a temperature no greater than 15° C., and in one embodiment at a temperature no greater than 10° C. Regardless, in one embodiment after combining the carbon-containing liquid solvent and water and forming the first precipitate, the carbon-containing liquid solvent may be boiled away from such combined solvent and liquid water. Such may result in additional of the first precipitate coming out of solution.

The first precipitate is dissolved in an organic liquid solvent that can form an azeotrope with water. Examples include dichloromethane, chloroform, tetrahydrofuran, benzene, carbon tetrachloride, toluene, ethylbenzene, ethylenedichloride, and 1,1,2-trichloroethylene. Further, the organic liquid solvent may include a combination of two or more organic liquid solvents. In one embodiment, the first precipitate is collected by filtering or other manner to separate such from the remaining solution from which such was precipitated. The dissolving may be conducted at any suitable temperature and pressure, with ambient room temperature and pressure being an example.

The organic liquid solvent having the dissolved first precipitate is combined with liquid water. An aqueous liquid phase and an organic liquid phase are formed as a result of the combination. Such may occur at any suitable temperature and pressure, with ambient room temperature and pressure being an example. Any suitable volume of water may be selected which results in formation of discernable aqueous and organic liquid phases.

The organic liquid phase is separated from the aqueous liquid phase. After such separating, liquid from the organic liquid phase is boiled away and leaves a resultant precipitate. The first precipitate has more water than any water in the resultant precipitate, and the resultant precipitate has greater concentration of PS-b-PXVP and less concentration of lithium salt than was in the starting solid. In one embodiment, the resultant precipitate has greater concentration PS-b-PXVP than was in the first precipitate, and/or the resultant precipitate has less concentration lithium salt than was in the first precipitate. Accordingly, the act of dissolving the first precipitate in an organic liquid solvent that can form an azeotrope with water, combining such with water, then separating out an organic liquid phase followed by boiling away the organic liquid phase may leave a more purified solid in the form of a resultant precipitate. The resultant precipitate may or may not have any remaining water. Regardless, such act of forming of the resultant precipitate may also remove other salts, metals, or other materials thereby increasing the purity of the PS-b-PXVP.

The process may be repeated with respect to the resultant precipitate. For example, the resultant precipitate may be dissolved in an organic liquid solvent that can form an azeotrope with water, and which may or may not be the same as the first-stated organic liquid solvent. The organic liquid solvent having the dissolved resultant precipitate would then be combined with liquid water and another aqueous liquid phase and another organic liquid phase formed therefrom. Such organic liquid phase would be separated from the aqueous liquid phase, with liquid from such organic phase being boiled away to leave a product precipitate. The resultant precipitate would have more water than any water that was in the product precipitate, and the product precipitate would have greater concentration PS-b-PXVP and less concentration lithium salt than was in the solid. Purity may also be improved in the product precipitate relative to the resultant precipitate as identified above with the resultant precipitate relative to the first precipitate. Again, the whole process could be repeated one or more additional times to achieve greater dryness and/or purity of PS-b-PXVP in the resultant and/or product precipitate.

In one embodiment, the resultant or product precipitate is ultimately collected. In one embodiment, the product precipitate may be collected by dissolving it in another organic liquid solvent. Such may be of the same composition as that as the organic liquid solvent that can form an azeotrope with water, or be of different composition. In one embodiment, such organic liquid solvent has a melting point greater than 0° C. and a boiling point less than 100° C. Examples include benzene, 1,4 dioxane, and nitrobenzene.

The organic solvent having the dissolved product precipitate therein is frozen. Then, the organic liquid solvent is sublimated away to leave the product precipitate. Pressure and temperature can be selected by the artisan for the sublimation to avoid liquid formation.

EXAMPLE

A solid that was 0.58 grams of commercially available PS-b-P2VP (32.5 kg/mole polystyrene and 12 kg/mole P2VP) was dissolved in 60 milliliters of tetrahydrofuran. The PS-b-P2VP prior to dissolving had approximately 460 ppm of $LiCl_x$, 23 ppm Na, 1 ppm K, 0.6 ppm Al, 0.4 ppm Ca, and 0.3 ppm Zn, all by weight. The solid was added to the 60 milliliters of tetrahydrofuran, and stirred at ambient room temperature and room pressure until dissolved.

The resultant solution was poured into 500 milliliters of deionized water received within a 1,000 milliliter round bottom flask, causing a white precipitate to form and collect in the bottom of the flask. The flask was connected to a distillation apparatus, and the mixture was heated to approximately 50° C. and placed under 30 Torr vacuum causing the liquid to boil. Such was continued for about two hours believed to be effective to distill away substantially all of the tetrahydrofuran. The resulting mixture of water and white precipitate was allowed to settle at ambient room temperature and pressure for 60+ hours.

The mixture was separated by pouring through a fritted glass funnel, and the water discarded. The remaining solid white precipitate was dissolved into 100 milliliters of liquid dichloromethane. The liquid dichloromethane having the dissolved precipitate was combined with liquid water in a separatory funnel and rocked back and forth for about 5 minutes, and then allowed to settle thereby forming resultant distinct aqueous liquid and organic liquid phases. Ten milliliters of water was used, and the organic liquid phase and the aqueous liquid phase were separated by draining the organic liquid phase from the bottom of the funnel flask. The water was discarded and the process repeated.

The resulting solution having dissolved precipitate therein was distilled at 39° C. for about 2 hours, with such being effective to boil away the liquid dichloromethane and leave a solid precipitate adhering to sidewalls of the vessel. This process was repeated.

The resultant residual/product material was dissolved in 60 milliliters of benzene at a temperature of about 80° C., and the resulting solution placed in a sublimation vessel. The sublimation vessel was placed within a freezer at a temperature of about 0° C. for about two hours effective to freeze the solution having the dissolved residual precipitate therein.

The sublimation vessel was then transferred to an ice bath, and the contents of the vessel pumped down to 1 Torr effective to sublimate the benzene away. The sublimation vessel was removed from the ice bath, and kept under vacuum pressure at room temperature overnight. Such left a product PS-b-P2VP precipitate of 0.522 grams. Such was PS-b-P2VP containing 0.1 ppm lithium chloride, 10 ppm Na, and all others at less than 10 ppm.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

The invention claimed is:

1. A block copolymer-comprising composition comprising PS-b-PXVP and a lithium salt, where "X" is 2 or 4, all lithium salt being present in the composition at no greater than 1 ppm by weight, the composition comprising salts other than lithium salt, the other salts individually being present in the composition at no greater than 10 ppm by weight.

2. A block copolymer-comprising composition comprising PS-b-PXVP and a lithium salt, where "X" is 2 or 4, all lithium salt being present in the composition at no greater than 1 ppm by weight, the composition comprising salts other than lithium salt, the other salts collectively being present in the composition at no greater than 25 ppm by weight.

3. The composition of claim 2 wherein the other salts are individually present in the composition at no greater than 10 ppm by weight.

4. A composition produced by the process:
providing a solution comprising dissolved PS-b-P2VP, dissolved PS-b-P4VP, and a dissolved lithium salt, the solution comprising a carbon-containing liquid solvent, the carbon-containing liquid solvent being soluble in liquid water;
combining the carbon-containing liquid solvent having the dissolved PS-b-P2VP, dissolved PS-b-P4VP, and a dissolved lithium salt with liquid water and precipitating a first precipitate therefrom, the first precipitate having greater concentration PS-b-P2VP and PS-b-P4VP and lower concentration of lithium salt than was in the solution;
dissolving the first precipitate in an organic liquid solvent that can form an azeotrope with water;
combining the organic liquid solvent having the dissolved first precipitate with liquid water and forming an aqueous liquid phase and an organic liquid phase therefrom;
separating the organic liquid phase from the aqueous liquid phase; and
after the separating, boiling away liquid from the organic liquid phase to leave a resultant precipitate, the first precipitate having more water than any water in the resultant precipitate, the resultant precipitate having greater concentration PS-b-P2VP and PS-b-P4VP and lower concentration of lithium salt than was in the solution, lithium salt being present in the resultant precipitate, all lithium salt in the resultant precipitate being present at no greater than 1 ppm by weight of the resultant precipitate, the resultant precipitate comprising salts other than lithium salt, the other salts individually being present at no greater than 10 ppm by weight of the resultant precipitate.

5. A composition produced by the process:
providing a solution comprising dissolved PS-b-P2VP, dissolved PS-b-P4VP, and a dissolved lithium salt, the solution comprising a carbon-containing liquid solvent, the carbon-containing liquid solvent being soluble in liquid water;
combining the carbon-containing liquid solvent having the dissolved PS-b-P2VP, dissolved PS-b-P4VP, and a dissolved lithium salt with liquid water and precipitating a first precipitate therefrom, the first precipitate having greater concentration PS-b-P2VP and PS-b-P4VP and lower concentration of lithium salt than was in the solution;
dissolving the first precipitate in an organic liquid solvent that can form an azeotrope with water;
combining the organic liquid solvent having the dissolved first precipitate with liquid water and forming an aqueous liquid phase and an organic liquid phase therefrom;
separating the organic liquid phase from the aqueous liquid phase; and
after the separating, boiling away liquid from the organic liquid phase to leave a resultant precipitate, the first precipitate having more water than any water in the resultant precipitate, the resultant precipitate having greater concentration PS-b-P2VP and PS-b-P4VP and lower concentration of lithium salt than was in the solution, lithium salt being present in the resultant precipitate, all lithium salt in the resultant precipitate being present at no greater than 1 ppm by weight of the resultant precipitate, the resultant precipitate comprising salts other than lithium salt, the other salts collectively being present in the composition at no greater than 10 ppm by weight of the resultant precipitate.

6. The composition of claim 5 wherein the other salts are individually present in the composition at no greater than 10 ppm by weight of the resultant precipitate.

7. A composition produced by the process:
dissolving a solid comprising PS-b-P2VP, PS-b-P4VP, and a lithium salt in liquid tetrahydrofuran;
combining the liquid tetrahydrofuran having the dissolved solid with liquid water and precipitating a first precipitate therefrom, the first precipitate having greater concentration PS-b-P2VP and PS-b-P4VP and lower concentration lithium salt than was in the solid;

dissolving the first precipitate in liquid dichloromethane;

combining the liquid dichloromethane having the dissolved first precipitate with liquid water and forming an aqueous liquid phase and an organic liquid phase therefrom;

separating the organic liquid phase from the aqueous liquid phase; and after the separating, boiling away liquid dichloromethane from the organic liquid phase to leave a resultant precipitate, the first precipitate having more water than any water in the resultant precipitate, the resultant precipitate having greater concentration PS-b-P2VP and PS-b-P4VP and lower concentration lithium salt than was in the solid, lithium salt being present in the resultant precipitate, all lithium salt in the resultant precipitate being present at no greater than 1 ppm by weight of the resultant precipitate, the resultant precipitate comprising salts other than lithium salt, the other salts individually being present at no greater than 10 ppm by weight of the resultant precipitate.

8. A composition produced by the process:

dissolving a solid comprising PS-b-P2VP, PS-b-P4VP, and a lithium salt in liquid tetrahydrofuran;

combining the liquid tetrahydrofuran having the dissolved solid with liquid water and precipitating a first precipitate therefrom, the first precipitate having greater concentration PS-b-P2VP and PS-b-P4VP and lower concentration lithium salt than was in the solid;

dissolving the first precipitate in liquid dichloromethane;

combining the liquid dichloromethane having the dissolved first precipitate with liquid water and forming an aqueous liquid phase and an organic liquid phase therefrom;

separating the organic liquid phase from the aqueous liquid phase; and after the separating, boiling away liquid dichloromethane from the organic liquid phase to leave a resultant precipitate, the first precipitate having more water than any water in the resultant precipitate, the resultant precipitate having greater concentration PS-b-P2VP and PS-b-P4VP and lower concentration lithium salt than was in the solid, lithium salt being present in the resultant precipitate, all lithium salt in the resultant precipitate being present at no greater than 1 ppm by weight of the resultant precipitate, the resultant precipitate comprising salts other than lithium salt, the other salts collectively being present in the composition at no greater than 10 ppm by weight of the resultant precipitate.

9. The composition of claim 8 wherein the other salts are individually present in the composition at no greater than 10 ppm by weight of the resultant precipitate.

10. A block copolymer-comprising composition comprising PS-b-PXVP and a lithium salt, where "X" is 2 or 4, all lithium salt being present in the composition at no greater than 1 ppm by weight, the composition comprising another salt other than lithium salt, the another salt being present in the composition at no greater than 10 ppm by weight.

11. The composition of claim 10 wherein all lithium salt is present in the composition at no greater than 0.1 ppm by weight.

12. The composition of claim 10 wherein the composition comprises PS-b-P2VP.

13. The composition of claim 10 wherein the composition comprises PS-b-P4VP.

14. The composition of claim 10 wherein the composition comprises PS-b-P2VP and PS-b-P4VP.

15. The composition of claim 10 wherein the lithium salt comprises lithium chloride.

16. The composition of claim 10 wherein PS-b-PXVP is present in the composition at no less than 99.99998% by weight.

17. The composition of claim 10 being homogenous.

18. The composition of claim 10 comprising Ni.

19. The composition of claim 10 comprising Cu.

20. The composition of claim 10 comprising Zn.

21. The composition of claim 10 being non-homogenous.

* * * * *